United States Patent
Gibbons

(10) Patent No.: US 7,213,236 B2
(45) Date of Patent: May 1, 2007

(54) METHOD OF BRIDGING BETWEEN .NET AND JAVA

(75) Inventor: Mark Philip Gibbons, Lausanne (CH)

(73) Assignee: Intrinsyc Software International, Inc., Vancouver, British Columbia (CA)

( * ) Notice: Subject to any disclaimer, the term of this patent is extended or adjusted under 35 U.S.C. 154(b) by 535 days.

(21) Appl. No.: 09/996,560

(22) Filed: Nov. 30, 2001

(65) Prior Publication Data

US 2003/0105883 A1    Jun. 5, 2003

(51) Int. Cl.
*G06F 9/44* (2006.01)
*G06F 9/45* (2006.01)

(52) U.S. Cl. .............. 717/136; 717/138; 717/139; 719/313; 719/330

(58) Field of Classification Search ........ 717/138–139; 719/313, 330
See application file for complete search history.

(56) References Cited

U.S. PATENT DOCUMENTS

| | | | | |
|---|---|---|---|---|
| 5,870,605 | A * | 2/1999 | Bracho et al. ............ | 719/318 |
| 6,085,030 | A * | 7/2000 | Whitehead et al. ........ | 709/203 |
| 6,253,228 | B1 * | 6/2001 | Ferris et al. .............. | 709/203 |
| 2002/0010739 | A1 * | 1/2002 | Ferris et al. .............. | 709/203 |
| 2002/0143641 | A1 * | 10/2002 | Thomas et al. ............ | 705/26 |
| 2003/0101235 | A1 * | 5/2003 | Zhang ...................... | 709/218 |
| 2003/0101438 | A1 * | 5/2003 | Mishra et al. ............. | 717/136 |

OTHER PUBLICATIONS

IBM Technical Disclosure Bulletin, Brokerless Objet Network, May 1, 1996, TDB-ACC-No.: NN960561, p. 1-2.*
Microsoft .NET Remoting: A Technical Overview (http:msdn.Microsoft.com/library/en-us/dndotnet/html/hawkremoting.asp?frame=true).

* cited by examiner

*Primary Examiner*—Tuan Dam
*Assistant Examiner*—Andre R. Fowlkes
(74) *Attorney, Agent, or Firm*—Matthew A. Pequignot; Hall, Vande Sande & Pequignot

(57) ABSTRACT

The invention is a method for allowing Java objects to communicate with .Net Remoting objects, with a first step of receiving metadata information from a .Net Remoting server on a Java client. Then, Java proxies are generated from said metadata information, using a Java development tool, with the Java proxies generated by a one-to-one mapping of .Net classes to Java classes. Finally, the Java proxies are implemented on the Java client, with the method provided solely in Java. Therefore, the Java client does not require any .Net components. The method can also be used to allow .Net Remoting objects to communicate with Java objects in a similar manner.

18 Claims, 4 Drawing Sheets

METHOD OF BRIDGING BETWEEN .NET AND JAVA

FIELD

The invention is related to methods of bridging between different computer languages and platforms, specifically between Java and Microsoft's .Net framework.

BACKGROUND

Web Services are part of the development in Microsoft's .Net framework for client-server communications. The .Net specification provides for two methods of accessing Web Services, SOAP (Simple Object Access Protocol) and .Net Remoting.

A Web Service is a unit of application logic providing data and services to other applications. Applications access Web Services via ubiquitous Web protocols and data formats such as HTTP, XML, and SOAP. The .Net platform from Microsoft represents one system of providing Web Services.

SOAP is an RPC mechanism that uses XML, usually over HTTP, to allow a client to access a server. SOAP is beneficial as it is an open-standard XML format allowing communication between different platforms. There exist several implementations of SOAP technologies for these platforms, as well as Java.

However, SOAP has limitations. The most significant is that the XML format is often not as fast or efficient as a high-speed binary format.

Also, SOAP lacks support for certain features. Notably, SOAP does not support activation of lifetime control of remote objects by the client (like DCOM for Windows). There is also no support for passing objects by reference and no support for callbacks or events.

SOAP also lacks some of the features provided by .Net. One is the lack of support for additional context information which is specific to .Net. It is intended that such information will be used in the future to enable features such as distributed transactions and additional security levels.

.Net Remoting is an alternative to SOAP, .Net Remoting is a distributed object protocol that uses binary or SOAP-based format over TCP or HTTP to allow a client to access a server. .Net Remoting addresses the limitations of SOAP by supporting additional features, but at the same time introduces limitations of its own.

The primary limitation of .Net Remoting is that it is specific to the .Net Framework and will only work with other .Net Frameworks. This presents a particular problem for developers and organizations that use Java and wish to combine the .Net Framework with Java.

It is an object of this invention to provide a method of bridging between Java and the .Net Framework. This method of bridging allows Java clients to use the .Net Remoting protocol to interact with a Web Service running in the .Net Framework. This method also allows .Net Framework clients to communicate with Java-based applications using the .Net Remoting protocol.

SUMMARY

The invention is a method for allowing Java objects to communicate with .Net Remoting objects, with a first step of receiving metadata information from a .Net Remoting server on a Java client. Then, Java proxies are generated from said metadata information, using a Java development tool, with the Java proxies generated by a one-to-one mapping of .Net classes to Java classes. Finally, the Java proxies are implemented on the Java client, with the method provided solely in Java. Therefore the Java client does not require any .Net components.

Preferably, the method also has a Java runtime tool for handling the Java proxies. This Java runtime tool may be capable of independent operation.

The invention further includes a method for allowing .Net Remoting objects to communicate with Java objects, with a first step of receiving metadata information from a Java server on a .Net Remoting client. Then, .Net proxies are generated from said metadata information, using a Java development tool, with the .Net proxies generated by a one-to-one mapping of Java classes to .Net classes. Finally, the .Net proxies are implemented on the .Net client, with the method provided solely in CLR metadata. Therefore the .Net client does not require any Java components.

The invention also includes a computer program capable of implementing the above methods.

BRIEF DESCRIPTION OF THE DRAWINGS

The invention itself both as to organization and method of operation, as well as additional objects and advantages thereof, will become readily apparent from the following detailed description when read in connection with the accompanying drawings.

DETAILED DESCRIPTION

The invention is designed to allow Java applications to talk to .Net Remoting objects without any .Net components running on the Java platform and will be referred to as Ja.Net (Java-.Net communication). Ja.Net is a 100% Java-based program designed as a solution to the Java-to-.Net communication problem, unlike other possible solutions that require the .Net Framework and the Java Virtual Machine to be running on the same machine.

Ja.Net operates in two modes. A development mode generates the necessary proxies to enable communication with a Java or .Net component. A runtime mode allows a user application to use the generated proxies to communicated with a Java or .Net component.

.Net Remoting

.Net Remoting is an protocol that facilitates distributed object level computing. Common Language Runtime (CLR), also referred to as .Net Runtime, supports many different languages, including C#, Visual Basic.Net, and C++. Ja.Net allows Java components to appear as CLR components, and CLR components to appear as Java components.

.Net Remoting permits the use of a number of different transport protocols and data formats. Currently, HTTP and TCP/IP transport protocols are supported along with SOAP and binary data formatting.

Java to .Net Development

The first type of implementation of Ja.Net is one that allows Java objects to talk to .Net Remoting objects. In other words, a Java client is enabled to understand .Net Remoting protocols. Any supported transport protocol and data format supported by .Net Remoting can be used.

Figure 1:
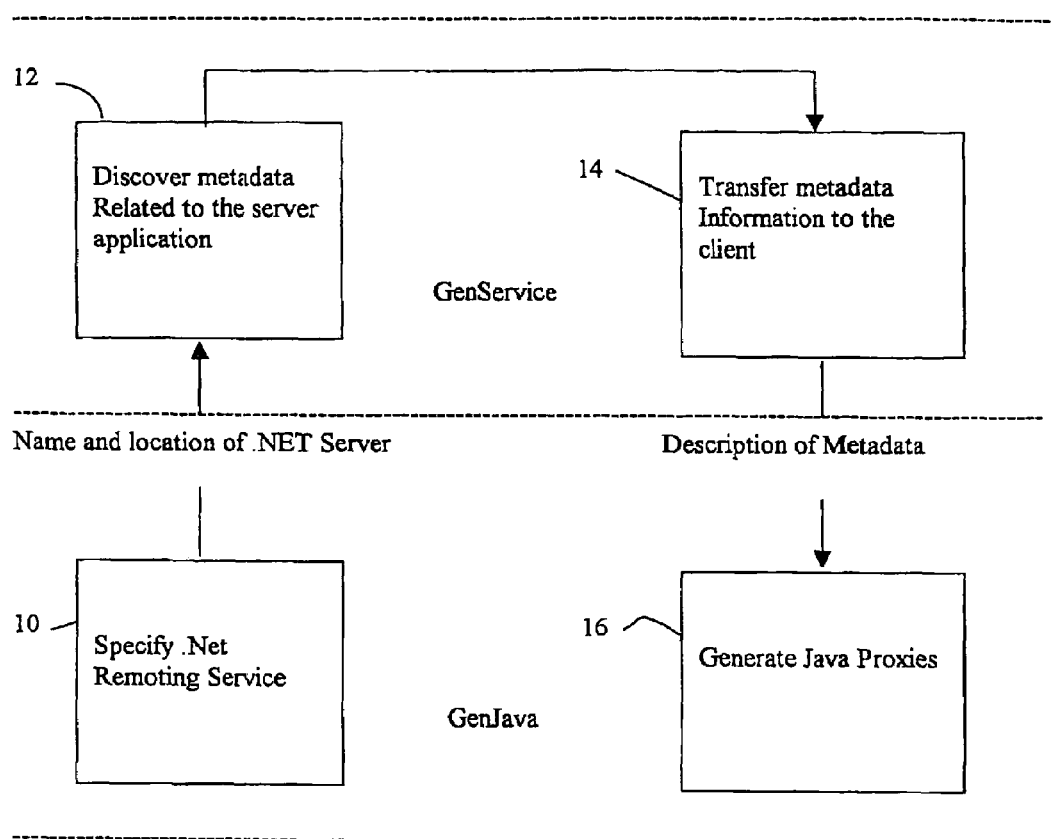
FIG. 1 is a diagram showing the process of generating Java proxies from .NET components.

The development steps for Java-to-.Net communication are shown in the flowchart of FIG. 1. The first step 10 is for the user to specify a name and location for the .Net Remoting server using a GenJava tool to interact with GenService, a continuous running service on the .Net Framework.

The next step 12 is to read the metadata which is related to the server application using GenService. The metadata is then sent (step 14) to the Java client as an XML file.

After receiving the metadata XML file, the Java client must generate (step 16) the necessary Java proxies to parallel the classes and interfaces listed in the metadata. The generated classes have all the methods and properties of the .Net classes. A mapping scheme is used to map the CLR (.Net) types to Java types during Java proxy generation. An example of CLR to Java type mapping is shown in Table 1.

TABLE 1

CLR-to-Java Mapping

| CLR Type | Java Type | Description |
| --- | --- | --- |
| void | void | Void |
| bool/System.Boolean | boolean | True/false value |
| char/System.Char | char | Unicode 16 bit char |
| string/System.String | java.lang.String | Unicode String |
| float32/System.Single | float | IEEE 32-bit float |
| float64/System.Double | double | IEEE 64-bit float |
| int8/System.Int8 | byte | Signed 8-bit integer |
| int16/System.Int16 | short | Signed 16-bit integer |
| int32/System.Int32 | int | Signed 32-bit integer |
| int64/System.Int64 | long | Signed 64 bit integer |
| unsigned int8/System.Byte | byte | Unsigned 8-bit integer |
| unsigned int16/System.UInt16 | short | Unsigned 16-bit integer |
| unsigned int32/System.UInt32 | int | Unsigned 32-bit integer |
| unsigned int64/System.UInt64 | long | Unsigned 64-bit integer |
| System.Object | java.lang.Object | Base class for all objects |
| System.MarshalByRefObject | java.lang.Object | Base class for all objects passed by reference |

There is a direct one-to-one mapping of .Net classes and Java classes. For example, a .Net class called "C" in the namespace "A.B" will generate a Java class named "C" in a Java package named "A.B". More importantly, the class hierarchy is maintained between the .Net and Java classes. This means that Java proxies are generated for the super classes and implemented interfaces of a .Net class as well. However, Java proxies are only generated for those .Net classes with public access. Arrays of class types are also supported, so that an array of x dimensions in .Net is mapped onto an array of x dimensions in Java.

Marshal by reference classes represent remote objects that return a proxy instead of passing along the object. Each access to the proxy therefore incurs a remote access to the original remote object.

.Net constructors with parameters are also supported. Each public constructor in a .Net class generates two corresponding Java constructors in the Java proxy. For example, the .Net constructor;

public Aclass (String s) { } results in the generation of two Java constructors:

public Aclass (String s) throws RemoteException { } and public Aclass (String s, String URI, String format, Boolean clientActivated) throws RemoteException { }

Both of the Java constructors use the same .Net constructor, however the first Java constructor reads the configuration parameters for the class from the configuration file, whereas the second Java constructor allows the configuration file settings to be overridden. By specifying any or all of the configuration details listed as parameters in the Java constructor, the settings in the configuration file are overridden by the parameter value.

The Java constructors can also throw a RemoteException in case of a communication failure, or in the event of an exception being thrown in the remote constructor itself.

For each public method in a .Net class, an equivalent Java method is generated. As with constructors, each method can throw a RemoteException in case of a communication failure, or in the event of an exception being thrown in the remote method itself.

Marshal by value classes are used when the class is a container for data. Marshal by value classes are serialized and transmitted. The Java proxy for a marshal by value class contains the fields of the .Net class as public variables, and no methods. Access to the fields does not incur any extra remote access.

For a given .Net interface, a Java interface and a Java class are generated. For example, for a .Net interface "Iface", a Java interface "Iface" and a Java class "IfaceProxy" are generated. The Java interface is used by the Java client code, whereas the Java class is used by the runtime to marshal calls through the Java interface. Methods in the interface are mapped as described for the marshal by references classes above.

.Net to Java Development

Ja.Net also allows the generation of .Net proxies in order to access a Java Virtual Machine™. The proxy files are C# source files (.cs) that implement classes and class members corresponding to those found in the specified Java classes.

Figure 2:
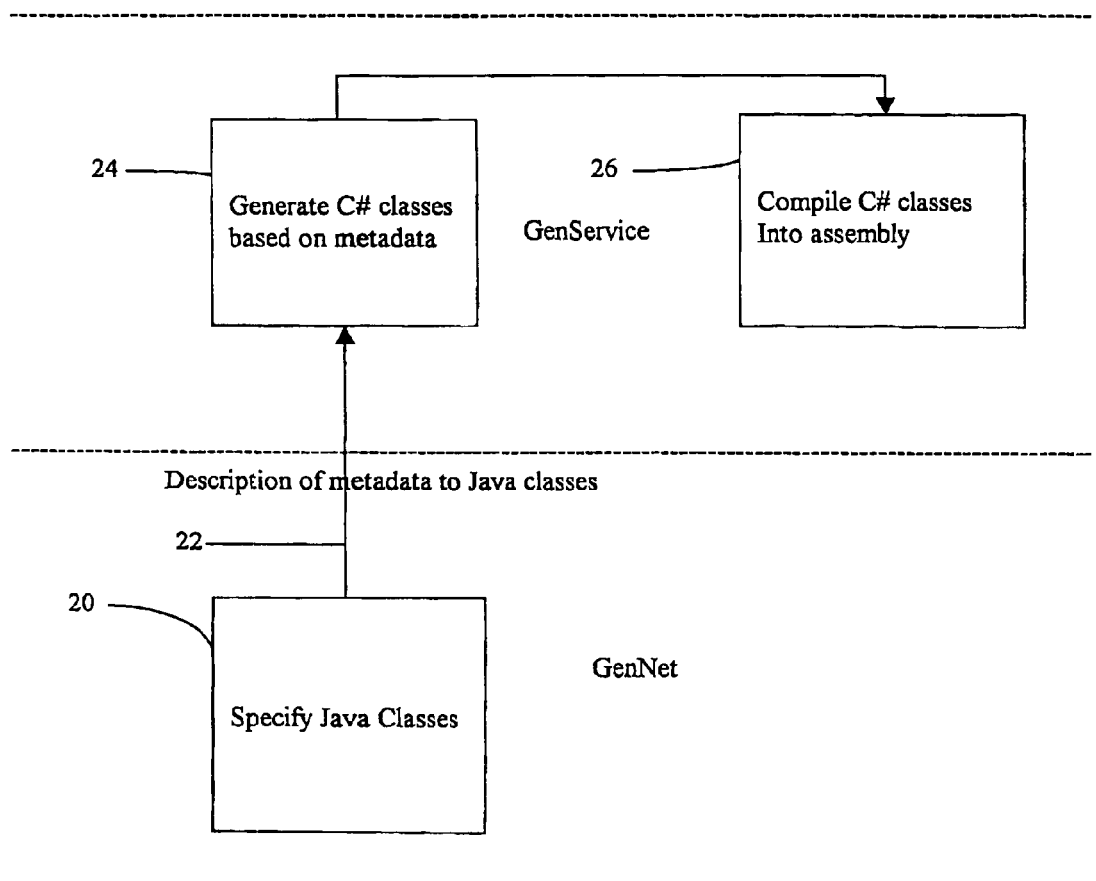
FIG. 2 is a diagram showing the process of generating .NET proxies from Java components.

The development steps for .Net-to-Java communication are shown in the flowchart of FIG. 2. The first step 20 is to specify the names of the Java classes for which a .Net proxy is required using a GenNet tool. This information is provided as metadata (an XML file).

The next step 22 is to send the metadata to the .Net client. This can be achieved by using GenService as discussed above for Java-to-.Net communciation.

When the .Net client receives the metadata XML file, GenService is used to generate (step 24) the necessary C# classes to parallel the classes and interfaces listed in the metadata. The generated classes have all the methods and properties of the Java classes. A mapping scheme is used to map the Java types to CLR (.Net) types during C# class generation. An example of CLR to Java type mapping is shown in Table 2. Finally, the C# files are compiled (step 26) into a proxy assembly so that the .Net client can access Java while Ja.Net is in runtime mode.

TABLE 2

Java-to-CLR Mapping

| Java Type | CLR Type | Description |
| --- | --- | --- |
| void | void | Void |
| boolean | bool | True/false value |
| char | char | Unicode 16 bit char |
| java.lang.String | string | Unicode String |
| float | float32 | IEEE 32-bit float |

TABLE 2-continued

Java-to-CLR Mapping

| Java Type | CLR Type | Description |
|---|---|---|
| double | float64 | IEEE 64-bit float |
| byte | int8 | Signed 8-bit integer |
| short | int16 | Signed 16-bit integer |
| int | int32 | Signed 32-bit integer |
| long | int64 | Signed 64 bit integer |
| Java.lang.Boolean | bool | True/false value |
| Java.lang.Char | char | Unicode 16 bit char |
| Java.lang.Float | float32 | IEEE 32-bit float |
| Java.lang.Double | float64 | IEEE 64-bit float |
| Java.lang.Byte | int8 | Signed 8-bit integer |
| Java.lang.Short | int16 | Signed 16-bit integer |
| Java.lang.Integer | int32 | Signed 32-bit integer |
| Java.lang.Long | int64 | Signed 64 bit integer |
| java.lang.Object | System.MarshalByRefObject | Base class for all objects passed by reference |

There is a direct one-to-one mapping of .Net classes and Java classes. Arrays of class types are also supported, so that an array of x dimensions in Java is mapped onto an array of x dimensions in .Net.

Marshaled classes, constructors and interfaces are all mapped in a similar fashion as described above for Java-to-.Net communication.

Runtime Mode

In order to use the proxies generated in the development mode in a user application, a Ja.Net runtime tool is required. The Ja.Net runtime tool provides bi-directional communication between Java and .Net using the proxies generated in the development mode.

Figure 3:
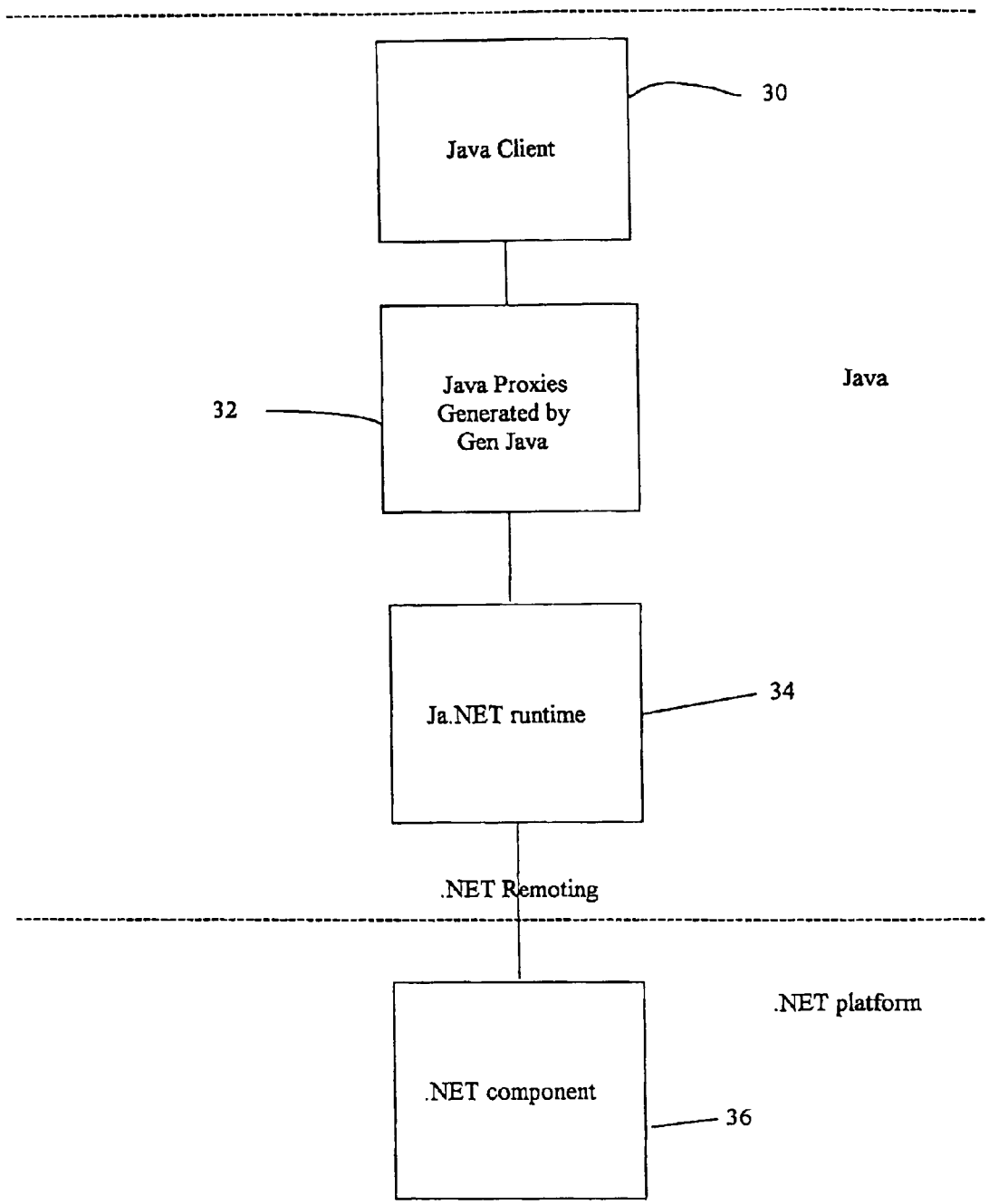
FIG. 3 is a diagram showing the process of Java client to .Net component communication using proxies.

FIG. 3 shows communication between a Java client 30 and a .Net component 36 using the Ja.Net runtime 34. The Java client 30 accesses the Ja.Net runtime 34 via the Java proxies 32 generated by GenJava. The Ja.Net runtime 34 then converts calls to Java proxies to .Net Remoting calls in order to access the .Net component 36.

Figure 4:
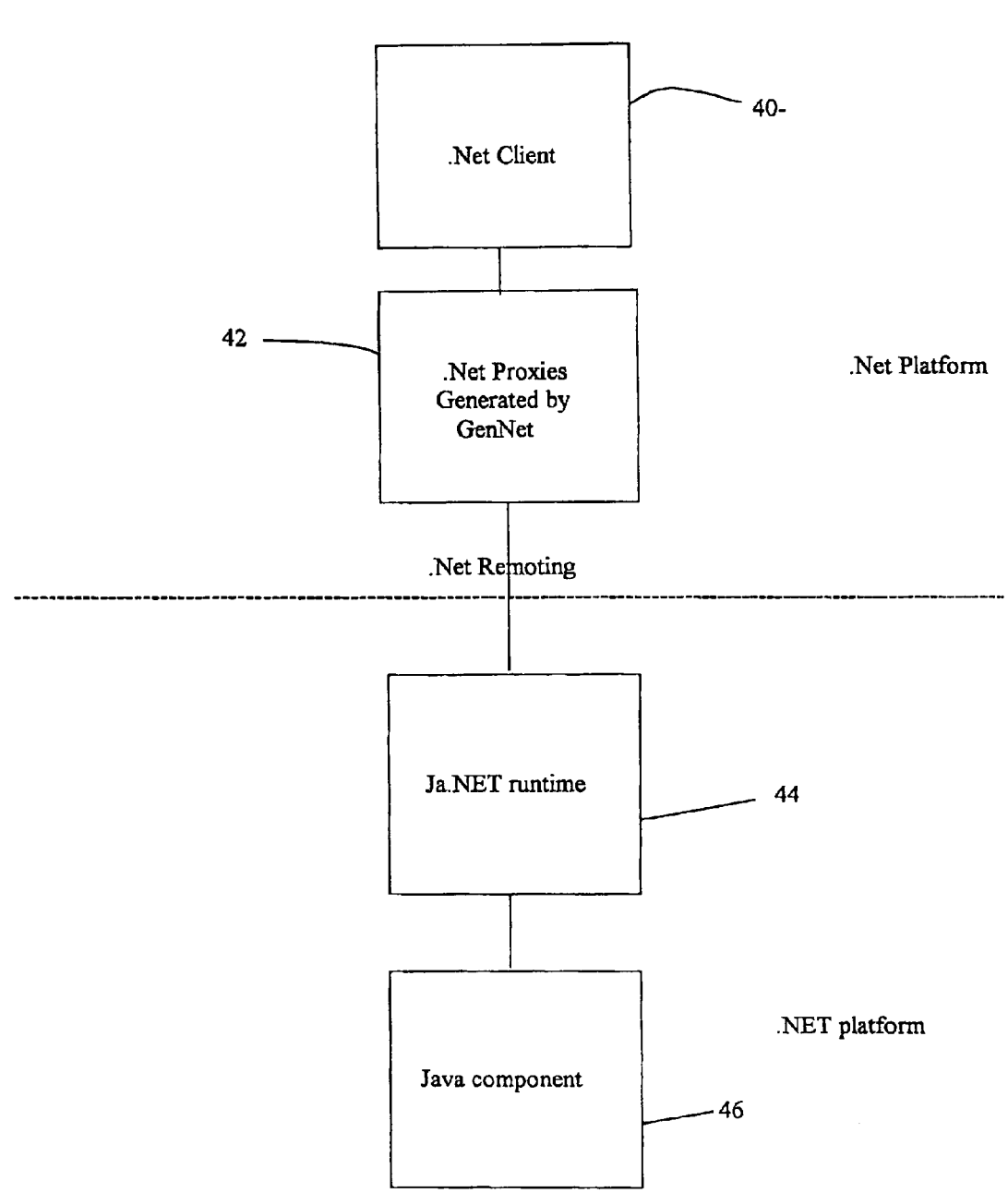
FIG. 4 is a diagram showing the process of .Net client to Java component communication using proxies.

FIG. 4 shows communication between a .Net client 40 and a Java component 46 using the Ja.Net runtime 44. The .Net client 40 invokes the .Net proxies 42 generated by GenNet. The Ja.Net runtime 44 converts .Net Remoting calls from the .Net proxies 42 in order to access the Java component 46.

The Ja.Net development tool is preferably distributed with the Ja.Net runtime tool, to allow for optimization and verification of applications in development, However, the Ja.Net runtime tool may be distributed by itself to allow end users to run applications developed for Ja.Net.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the scope of the invention.

I claim:

1. A method for allowing objects in a first programming language to communicate with objects in a second programming language without the use of a broker, comprising:

a) receiving metadata information from a server running said second programming language on a client running said first programming language;

b) generating proxies for said first programming language on said client from said metadata information, wherein said proxies are generated by a one-to-one mapping of classes from said second programming language to said first programming language; and c) implementing said proxies on said client, wherein said method is provided solely in said first programming language and said client does not require any components from said second programming language.

2. The method according to claim 1, including an additional step d) using said proxies to enable bi-directional communication between said client and said server.

3. The method according to claim 1, wherein said first programming language is a JAVA cross platform programming language and said second programming language is common language runtime (CLR).

4. The method according to claim 1, wherein said first programming language is a .Net Remoting programming language and said second programming language is a JAVA cross platform programming language.

5. The method according to claim 1, wherein said client and said server communicate using SOAP formatted messages.

6. The method according to claim 1, wherein said client and said server communicate using binary formatted messages.

7. The method according to claim 1, including the additional step of passing said proxies to a runtime tool using said first programming language.

8. The method according to claim 7, wherein said proxies are generated using a development tool for said first programming language.

9. A brokerless system enabling bi-directional communication using .Net Remoting protocol between JAVA objects in a JAVA virtual machine environment and .Net assemblies objects in a common language runtime (CLR) environment, comprising:

(a) a computer network;

(b) a JVM computer having random access memory (RAM) and at least one of hard disk storage memory (HDS) and solid state storage memory (SSSM), said computer having a JAVA Virtual Machine (JVM) environment and JAVA objects in one of said HDS and SSSM, said JVM computer coupled to said computer network;

(c) a CLR computer having random access memory (RAM) and at least one of hard disk storage memory (HDS) and solid state storage memory (SSSM), said computer having a CLR environment and .Net assemblies in one of said HDS and SSSM, said CLR computer coupled to said network;

(d) a JAVA development computer with a RAM, and at least one of HDS and SSSM, said JAVA development computer having a JVM environment and a JAVA-based tool in one of said HDS or SSSM, said JAVA development computer coupled to said network, wherein (i) said JAVA-based tool generates JAVA proxies corresponding to specified .Net assemblies running on said CLR computer, wherein said JAVA proxies are generated by a one-to-one mapping of classes between JAVA and CLR; and (ii) said JAVA proxies are copied onto said JVM computer and are operative to allow said JAVA objects to communicate with specified .Net assemblies on said CLR computer;

(e) a CLR development computer having memory comprising RAM, and at least one of HDS and SSSM, and having a CLR environment in said memory, said CLR development computer coupled to said computer network, and having a CLR-based tool in said memory wherein said CLR-based tool generates .Net proxies corresponding to specified JAVA objects, wherein said .Net proxies are generated by a one-to-one mapping of classes between JAVA and CLR, and wherein said .Net proxies are copied onto said CLR computer and are operative to allow said CLR objects to communicate with said specified JAVA objects on said JVM computer.

10. The system of claim 9, further comprising a JAVA cross platform programming language based runtime tool stored on said JVM computer for handling said JAVA proxies and said .Net proxies.

11. The system of claim 10, wherein said JAVA cross platform programming language based runtime tool is capable of operating independently of said JAVA cross platform programming language based tools for generating JAVA and .Net proxies.

12. A computer readable medium having instructions in a first programming language which, when executed by a client, enable objects in said first programming language to communicate with objects in a second programming language without the use of a broker, said instructions comprising:
  a) receiving metadata information from a server running said second programming language;
  b) generating proxies on said client from said metadata information, wherein said proxies are generated by a one-to-one mapping of classes from said second programming language to said first programming language; and
  c) implementing said proxies on said client, wherein said instructions are provided solely in said first programming language and said client does not require any components from said second programming language.

13. The computer readable medium according to claim 12, wherein said instructions include an additional step d) using said proxies to enable bi-directional communication between said client and said server.

14. The computer readable medium according to claim 12, wherein said first programming language is a JAVA cross platform programming language and said second programming language is common language runtime (CLR) .

15. The computer readable medium according to claim 12, wherein said client and said server communicate using SOAP formatted messages.

16. The computer readable medium according to claim 12, wherein said client and said server communicate using binary formatted messages.

17. The computer readable medium according to claim 12, including the additional step of passing said proxies to a runtime tool using said first programming language.

18. The computer readable medium according to claim 17, wherein said proxies are generated using a development tool for said first programming language.

* * * * *